US009720975B2

(12) United States Patent
Zaman et al.

(10) Patent No.: US 9,720,975 B2
(45) Date of Patent: Aug. 1, 2017

(54) DYNAMIC INFLUENCE TRACKING ENGINE AND METHOD

(71) Applicant: Massachusetts Institute of Technology, Cambridge, MA (US)

(72) Inventors: Tauhid Rashed Zaman, Brookline, MA (US); Devavrat D. Shah, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 157 days.

(21) Appl. No.: 13/754,320

(22) Filed: Jan. 30, 2013

(65) Prior Publication Data
US 2013/0198205 A1    Aug. 1, 2013

Related U.S. Application Data

(60) Provisional application No. 61/592,050, filed on Jan. 30, 2012.

(51) Int. Cl.
*G06F 7/00* (2006.01)
*G06F 17/30* (2006.01)

(52) U.S. Cl.
CPC .... *G06F 17/3053* (2013.01); *G06F 17/30867* (2013.01)

(58) Field of Classification Search
CPC ...................................................... G06Q 50/01
USPC .......................................................... 707/748
See application file for complete search history.

(56) References Cited

U.S. PATENT DOCUMENTS

| 7,596,571 | B2 * | 9/2009 | Sifry | |
| 8,166,026 | B1 * | 4/2012 | Sadler | ............................. 707/725 |
| 8,600,812 | B2 * | 12/2013 | Zhang et al. | ................ 705/14.66 |
| 8,826,453 | B2 * | 9/2014 | Arrelid et al. | .................... 726/27 |
| 2010/0088130 | A1 * | 4/2010 | Bonchi et al. | ....................... 705/7 |
| 2010/0088314 | A1 * | 4/2010 | Kuang | .............. G06F 17/30864 |
| | | | | 707/733 |
| 2011/0087658 | A1 * | 4/2011 | Lunt et al. | ...................... 707/727 |
| 2011/0196855 | A1 * | 8/2011 | Wable | ................ G06F 17/30631 |
| | | | | 707/711 |
| 2013/0346841 | A1 * | 12/2013 | Ahmed | .................... H04L 67/22 |
| | | | | 715/208 |
| 2014/0258288 | A1 * | 9/2014 | Work et al. | ..................... 707/734 |

* cited by examiner

*Primary Examiner* — Cheyne D Ly
(74) *Attorney, Agent, or Firm* — Peter A. Nieves; Sheehan Phinney Bass & Green PA

(57) ABSTRACT

An engine and method for tracking the influence of an entity operating within a social network are presented. A query containing social network content is received. A database for entries referencing the social network content is searched, and interactions between an entity participating within the social network and the social network content are identified. A dynamic interaction network (DIN) of a plurality of the entities is identified and a dynamic influence score for an entity in the query specific DIN is calculated.

17 Claims, 4 Drawing Sheets

DYNAMIC INFLUENCE TRACKING ENGINE AND METHOD

CROSS-REFERENCE TO RELATED APPLICATIONS

This application claims the benefit of U.S. Provisional Patent Application Ser. No. 61/592,050, filed Jan. 30, 2012, entitled "DYNAMIC INFLUENCE TRACKING ENGINE AND METHOD," which is incorporated by reference herein in its entirety.

FIELD OF THE INVENTION

The present invention relates to networks, and more particularly, is related to social network metrics.

GOVERNMENT SUPPORT STATEMENT

This invention was made with government support under Contract No. FA9550-09-1-0317 awarded by the Air Force Office of Scientific Research. The government has certain rights in the invention.

BACKGROUND OF THE INVENTION

Social media refers to electronic interactions among people, or entities, which interact by creating, sharing, and exchanging content in virtual communities and networks. Content in user interactions may include text, such as comments, media, or links to media, such as photographs, videos, and web site URLs. Social media employ mobile and web-based technologies creating interactive platforms where individuals and communities create, share, discuss, and modify user-generated content.

Examples of different types of social media include collaborative projects such as Wikipedia, blogs such as Blogger, social networking sites such as Facebook, content communities such as YouTube, and virtual worlds such as Second Life.

While social media outlets provide tools for searching their content, they do not provide tools that correlate the interaction of an entity with social media content, and the influence of that entity. Therefore there is a need in the industry to address these shortcomings.

SUMMARY OF THE INVENTION

Embodiments of the present invention provide a dynamic influence tracking engine and method. Briefly described, a first aspect of the present invention is directed to a method for tracking the dynamic influence of an entity operating within a social network with a processor. A query comprising social network content is received. A database is searched for entries referencing the social network content. An interaction between an entity participating within the social network and the social network content is identified, wherein the interaction occurs within a specified time window. A query specific dynamic interaction network (DIN) comprising a plurality of the entities is queried. A dynamic influence score for an entity in the query specific DIN is calculated.

Briefly described, in architecture, a second aspect of the present invention is directed to an engine for tracking the dynamic influence of an entity operating within a social network. The engine includes a user interface with a query interface and a display interface. A social network database is configured to maintain social network data. A processor is configured to receive a query from the query interface. The processor includes a communications interface with the social network, a dynamic influence score calculation module configured to calculate a dynamic influence score for an entity associated with the query, and a dynamic influence network (DIN) construction module configured to construct a query specific DIN. The processor is in communication with the social network database and the user interface.

Briefly described, a third aspect of the present invention is directed to non-transient computer readable media comprising machine executable instructions for tracking the dynamic influence of an entity operating within a social network with a processor. The instructions provide the following functionality when executed. A query comprising social network content is received. A database is searched for entries referencing the social network content. An interaction between an entity participating within the social network and the social network content is identified, wherein the interaction occurs within a specified time window. A query specific dynamic interaction network (DIN) comprising a plurality of the entities is queried. A dynamic influence score for an entity in the query specific DIN is calculated.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

The present invention provides exemplary embodiments of systems and methods for a dynamic influence tracking engine. The general purpose of the dynamic influence tracking engine (DITE) is to determine the real time influence of entities in a social network. As used herein, the influence of an entity in a social reference may refer to the strength of correlation between an entity and social network content, and/or the reach within the social network of one entity to proliferate social media content to other entities. The engine calculates a dynamic influence score of entities in a social network with respect to a user specified query within a time window, hence use of the term dynamic influence. The DITE is based on an influence score which combines the frequency of the social network activity of the entity with the position of the entities in various dynamic interaction networks (DINs) within the social network, including query specific DINs. As used herein, a DIN refers to two or more entities associated with specific social media content over a defined time window.

These dynamic influence scores can be used to determine query influence and time specific influence of entities in a social network. However, dynamic influence scores can also be used for searching in a social network. A user can search a social network for content matching a certain query and the search results can be ranked based upon the dynamic influence score of the entities that created the content.

Figure 1:
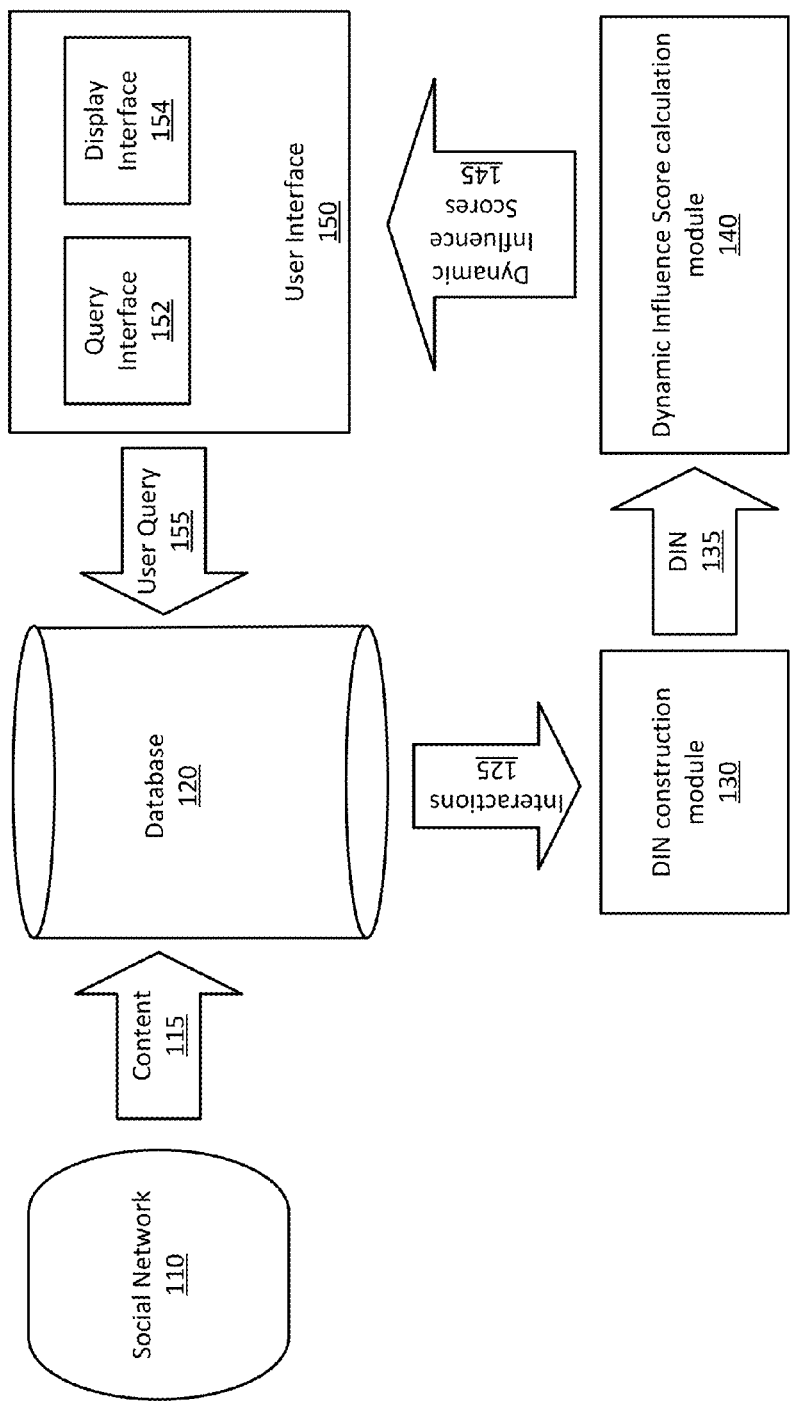
FIG. 1 is a block diagram of an exemplary embodiment of a dynamic influence tracking engine.

A system diagram of an exemplary engine for the DITE is shown by FIG. 1. A user may use the DITE user interface 150 to provide a query and optionally a time window to the query interface 152. The user query 155 is used by the DIN construction module 130 to construct a query specific DIN 135 from social network data 115 stored in a database 120, using data that falls within the user specified time window. If no time window is specified, then a default time window is used. The DITE then calculates a dynamic influence score 145 for each entity in this query specific DIN using a dynamic influence score calculation module 140. This module also calculates a dynamic influence score 145 from the global DIN consisting of all activity in the social network 110 within the time window. These scores are then combined in an appropriate manner to produce an overall dynamic influence score for each of the entities in the query specific DIN. The overall dynamic influence scores 145 are returned to the user via the display interface 154.

The DITE is collects and stores content generated in the social network 110. This may be accomplished through the use of an automated computer program which collects data from a social network 110 and stores the collected data in the database 120. This data includes interactions 125 and is used as the basis for constructing the DINs upon which the dynamic influence scores 145 are calculated.

The DIN construction module 140 constructs the DINs using interactions in the social network 110 contained in the data stored in the database 120. Two entities are said to be connected by an edge in the DIN if they have an interaction in the social network 110 within the time window. These interactions can be any type of activity in the social network 110 such as, but not limited to, posting content, exchanging messages, or forwarding content. These interactions within a specific time window constitute the dynamic and interaction aspects of the DIN. The interaction edges for the entities are then connected to form the DIN. The query specific DIN is constructed in this manner using only interactions involving the user query. For example, in the interaction the query may appear in a message or it may appear in content posted or forwarded by an entity.

Once the user query DIN and the global DIN are constructed for the given time window, the DITE dynamic influence score calculation module 140 calculates the dynamic influence score 145 for all entities in each of these two DINs. The score can be arbitrary, but it must utilize the global structure of the DIN in some manner to determine the relative dynamic influence of entities. Once the dynamic influence scores for the global and query specific DINs are calculated, they are then combined in an appropriate manner to produce the overall dynamic influence score. For example, this combination can be a weighted sum of the scores, a weighted product, or any other application dependent combination. These overall dynamic influence scores for the entities within the query specific DIN are then returned to the user via the display interface 154. With these scores, the user can see how influential different entities are on different queries or topics within specific time windows.

Figure 2:
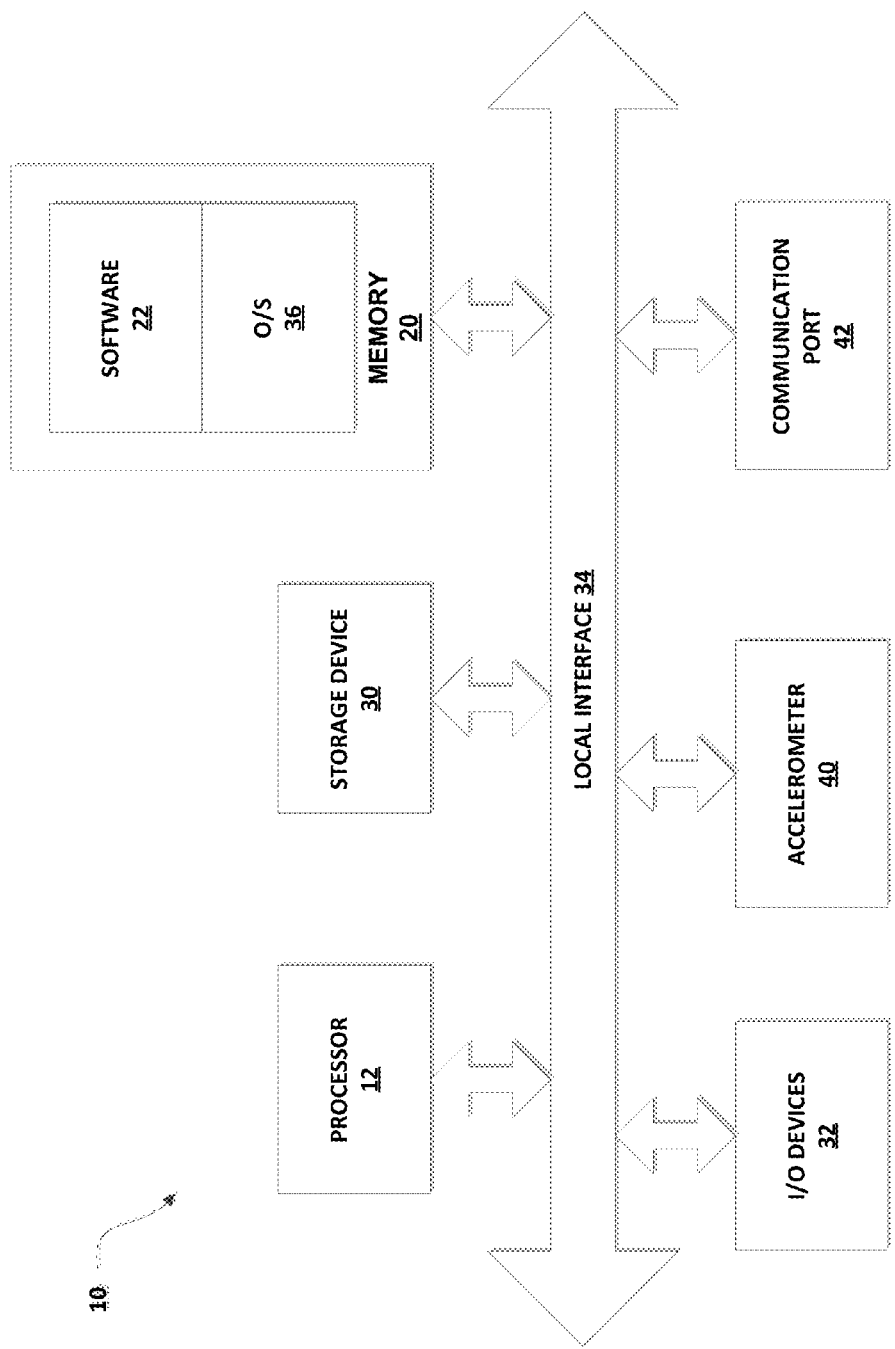
FIG. 2 is a schematic diagram illustrating an example of a system for executing functionality of the present invention.

Functionality of the present system and method can be implemented in software, firmware, hardware, or a combination thereof. In a first exemplary embodiment, a portion of the system is implemented in software, as an executable program, and is executed by a special or general-purpose digital computer, such as a personal computer, workstation, minicomputer, or mainframe computer. The first exemplary embodiment of a general-purpose computer architecture that can implement the system 10 is shown in FIG. 2. It should be noted that the system 10 of FIG. 2 may contain the database (i.e., storage device 30) therein. In addition, the DIN construction module and dynamic influence score calculation module may be located within software 22 of a memory 20, while a query interface and display interface are examples of I/O devices 32.

Generally, in terms of hardware architecture, as shown in FIG. 1, the computer 10 includes a processor 12, memory 20, storage device 30, and one or more input and/or output (I/O) devices 32 (or peripherals) that are communicatively coupled via a local interface 34. The local interface 34 can be, for example but not limited to, one or more buses or other wired or wireless connections, as is known in the art. The local interface 34 may have additional elements, which are omitted for simplicity, such as controllers, buffers (caches), drivers, repeaters, and receivers, to enable communications. Further, the local interface 34 may include address, control, and/or data connections to enable appropriate communications among the aforementioned components.

The processor 12 is a hardware device for executing software, particularly that stored in the memory 20. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 20 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 20 may incorporate electronic, magnetic, optical, and/or other types of storage media. Note that the memory 20 can have a distributed architecture, where various components are situated remotely from one another, but can be accessed by the processor 12.

The software 22 in the memory 20 may include one or more separate programs, each of which contains an ordered listing of executable instructions for implementing logical functions of the system 10, as described below. In the example of FIG. 2, the software 22 in the memory 20 defines the system 10 functionality in accordance with the present invention. In addition, the memory 20 may contain an operating system (O/S) 36. The operating system 36 essentially controls the execution of computer programs and provides scheduling, input-output control, file and data management, memory management, and communication control and related services.

The system 10 may be provided by a source program, executable program (object code), script, or any other computing entity containing a set of instructions to be performed. In the case of a source program, the program is translated via a compiler, assembler, interpreter, or the like, which may or may not be included within the memory 20, in order to operate properly in connection with the O/S 36. Furthermore, the system 10 can be written as (a) an object oriented programming language, which has classes of data and methods, or (b) a procedural programming language, which has routines, subroutines, and/or functions.

The I/O devices 32 may include input devices, for example but not limited to, a keyboard, mouse, scanner, microphone, etc. Furthermore, the I/O devices 32 may also include output devices, for example but not limited to, a printer, display, etc. Finally, the I/O devices 32 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the system 10 is in operation, the processor 12 is configured to execute the software 22 stored within the memory 20, to communicate data to and from the memory 20, and to generally control operations of the computer 10 pursuant to the software 22. The software 22 and the O/S 36, in whole or in part, but typically the latter, are read by the processor 12, perhaps buffered within the processor 12, and than executed.

When the system 10 is implemented in software, as is shown in FIG. 2, it should be noted that the system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The system 10 can be embodied in any computer-readable medium for use by or in connection with an instruction execution system, apparatus, or device, such as a computer-based system, processor containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 10 is implemented in hardware, the system 10 can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

To implement a search in a social network with the DITE, a user provides a query and optionally a time window. The DITE calculates one or more dynamic influence scores on the appropriate DINs and then additionally returns all content in the social network that matches the query. The matching content is shown in a display interface, ranked in order of decreasing score of the entities which created the content.

An example of implementation of the present system and method is provided below with regarding to use on Twitter for tracking influence. Specifically, there is a Twitter crawler which collects tweets from the Twitter streaming API and stores them in a database. A user goes to the homepage associated with the present invention and enters a query along with a time window. The present system then takes the following actions.

1. Construct the retweet network using all tweets in the database which match the query and time window of the user.
2. Calculate the score of every entity on this retweet network.
3. Return to the user a list of all entities on the retweet network, ranked by their score. Also return all tweets of these entities corresponding to the query and time window of the user.

There are two important issues associated with the present invention, among others. The first is the construction of dynamic, query specific retweet networks. This allows very precise influence information to be obtained. The second is the score, which provides the correct quantification of this influence.

This score is based upon rumor centrality with an appropriate normalization. There are often multiple connected components in a retweet network. The present invention scales the rumor centralities by the size of the connected components to obtain the scores. Assume a user v belongs to a certain connected component of the retweet graph G. Referring to the sub graph corresponding to this connected component as Gc and denote the number of nodes it contains as Nc node. The score of v is TR(v,G). This score is given by equation 1.

$$TR(v,G)=2(N_c-1)\times[(R(v,Gc)/(\Sigma_{u\in Gc}R(u,Gc))] \qquad \text{(eq. 1)}$$

Figures 3, 4:
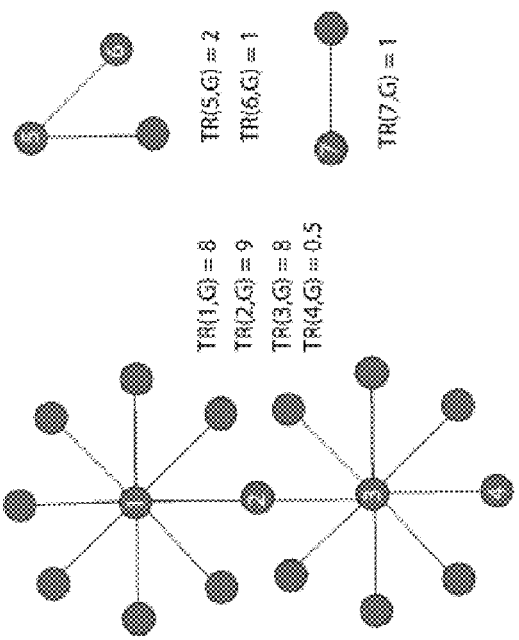
FIG. 3 is a diagram of an exemplary retweet network having three connected components.
FIG. 4 is an exemplary screen shot of entity scores.

The score of a node is its attachment probability under topological network growth (TNG) with rumor centrality, scaled by the size of its connected component. To understand this score better, consider the retweet network with three connected components in FIG. 3. The scores of these nodes are shown in FIG. 3 as well. As can be seen, for this simple example, the score roughly corresponds to the degree of the nodes. An exception to this is node 2 which has a score higher than its degree. This is because this node has a strong strategic position, as it connects two hubs. Thus, the score does more than identify influential nodes by their degree. It also takes into account the global structure of the network. Also, it gives more weight to nodes in larger connected components. This makes sense, because these nodes have a larger potential roach than nodes in smaller connected components.

An exemplary screenshot of scores is shown in the table of FIG. 4. The search results are for the query "S&P" from Aug. 6, 2011 to Aug. 7, 2011. This topic is significant because on August 5th, the rating agency S&P downgraded the credit rating of the U.S. government. There are 485 users in this retweet network. The present invention was able to process the query (construct retweet graph and calculate scores) and return the results in under one second on a standard PC with a 1.8 GHz processor. The present system results identify users who have been heavily retweeted on this topic, such as BreakingNews and thinkprogress. The top scoring users for this query and time window are listed in FIG. 4. To show the dynamic nature of influence that the present system captures, we also show the scores for the same query, but from Aug. 5, 2011 to Aug. 6, 2011. The scores are relatively constant, but thinkprogress has a higher score than BreakingNews and the score of WSJ is higher than CNBC.

Therefore, influence depends upon the time window used. We compare these results with results from the search engine of Twitter using its "top" search feature. The Twitter search results contain recent tweets (less than a few hours old), but only one heavily retweeted tweet (from tinyrevolution). In contrast, the present system produces heavily retweeted users from over two days. Historical search is not available on the search engine of Twitter, in contrast to the present system. A Twitter search is geared more towards real time tweets than to historic influential tweets. Also, it is difficult to directly compare these results as the present system uses the Twitter public streaming API which only provides 1% of the total volume of data on Twitter, since so many tweets are missing from the database. Despite this sparsity of data, the present system still produces relevant tweets from influential users, in contrast to Twitter which focuses on real time search.

Another important aspect of the present system is the flexibility it provides the user as well as the quantitative information it provides. With the present system, a user can obtain numerical values for the influence of users on specific topics. This information can be used for many different applications. For example, the scores can be used to determine how to allocate resources for users in any sort of marketing campaign. Also, tracking the scores over time can allow a user to determine whose influence is rising or falling. We emphasize again that all this information is topic specific, thereby providing very fine grained influence information.

Finally, it is noted that the scores are based on rumor centrality, which were proportional to retweet probabilities in the TNG with rumor centrality model. Therefore, one can use the scores to predict the reach of tweets by different users. The scores obtain the retweet probabilities using only the retweet network structure. These probabilities are accurate and may be incorporated into a system that can predict retweets and reach on Twitter.

Method

Figure 5:
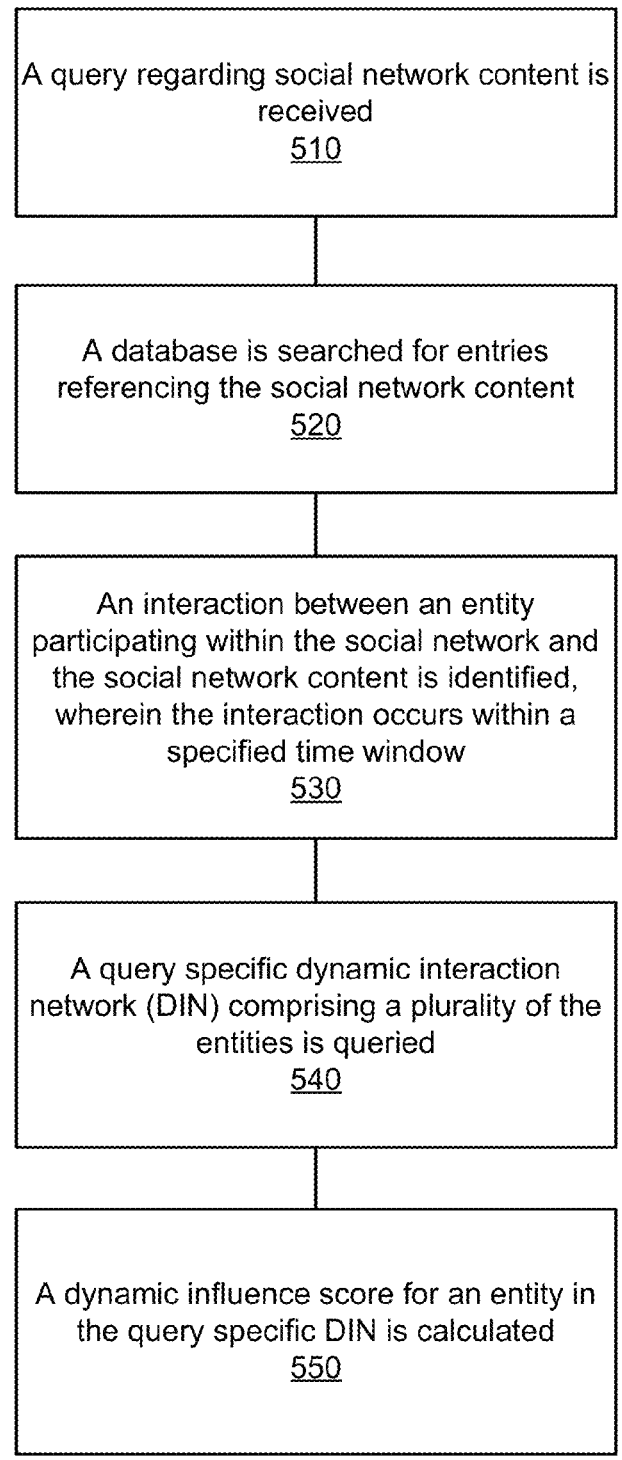
FIG. 5 is a flowchart of a first exemplary method for tracking the influence of an entity operating with a social network.

FIG. 5 is a flowchart of a first exemplary method for tracking the influence of an entity operating with a social network. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A query regarding social network content is received, as shown by block 510. A database is searched for entries referencing the social network content, as shown by Hock 520. An interaction between an entity participating within the social network and the social network content is identified, wherein the interaction occurs within a specified time window, as shown by block 530. A query specific dynamic interaction network (DIN) comprising a plurality of the entities is queried, as shown by block 540. A dynamic influence score for an entity in the query specific DIN is calculated, as shown by block 550. For example, the dynamic influence score may be calculated using Eq. 1, above.

Advantages and Improvements Over Existing Methods

The present approach to evaluating the influence of entities in social networks with a DITE has several advantages over existing methods. First, the DITE uses the dynamic nature of the interactions. That is, the DITE uses data that is within a certain time window. This allows the DITE to determine dynamic influence at different time periods. Second, the DITE influence scores are calculated using a query specific DIN which allows the influence scores to be highly query specific. This allows a user to determine not just global influence of entities, but also influence of entities on specific topics. The finer resolution of influence is much more useful than coarser global measures of influence, especially for users looking for influential users on very specific topics. Finally, the DITE uses a novel influence score which provides the proper quantification of the influence of different entities. This proper quantification is important because it assigns a relevant numerical influence score to each entity, which the user can then use to make decisions. For example, a company wishing to market a new product can use these influence scores to determine how to allocate marketing resources to each influential entity in the social network.

Commercial Applications

Influence scores for entities in a social network are a very important resource for a host of different applications involving the dissemination of information. For example, companies that wish to utilize social media to market new products can use the DITE to learn which entities are influential with respect to their product, and also how influential the entities are. This quantification of influence can be used to determine how to allocate marketing resources. As another example, politicians may wish to find influential voices in order to design effective campaigning or messaging strategies. Politicians would also benefit from issue specific influence scores provided by the DITE. A third type of application of the DITE is searching for content in social networks. When a user types in a search query into the DITE, it can return all content matching the query, and then rank the content by the dynamic influence score of the entities that created the content. In this way, a social search engine can be built using the DITE. In general, having topic specific, dynamic quantified influence scores provided by the DITE is useful to anyone wishing to effectively disseminate information through or search for content within a social network.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for tracking the dynamic influence of an entity operating within a social network with a processor, comprising the steps of:

receiving a query comprising user-generated social network content;
searching a database for entries referencing the social network content;
identifying an interaction between an entity participating within the social network and the social network user-generated content, wherein the interaction comprises proliferating the social network media content to other entities and occurs within a specified time window;
identifying a query specific dynamic interaction network (DIN) comprising a plurality of said entities;
calculating a dynamic influence score for an entity in the query specific DIN,
constructing the query specific DIN using data from the social network that falls within the specified time window and calculating a query specific dynamic influence score for each entity in the query specific DIN, and constructing a global DIN using data from the social network that falls within the specified time window and calculating a global dynamic influence score from the global DIN; and
calculating a global dynamic influence score from the global DIN and combining at least one of the query specific dynamic influence scores and the global dynamic influence score to produce an overall dynamic influence score for each entities in the query specific DIN,
wherein the query specific DIN is constructed using only interactions involving the query, and the dynamic influence score comprises a measure of the reach of an entity with the DIN to proliferate social network media content to other entities, and
wherein the overall dynamic influence scores enable the user to see how influential different entities are on different queries or topics within specific time windows.

2. The method of claim 1, wherein the specified time window is a default time window.

3. The method of claim 1, wherein the specified time window is a query provided time window.

4. The method of claim 1, wherein if the query provides a time window, the specified time window is the query provided time window, otherwise the specified time window is a default time window.

5. The method of claim 1, wherein the dynamic influence score further comprises:
a degree component; and
a reach component.

6. The method of claim 5, wherein the degree component comprises a correlation level between the entity and the social network content.

7. The method of claim 1, further comprising the step of assigning a rank to the entity based in part on the dynamic influence score.

8. The method of claim 1, further comprising the step of displaying the dynamic influence score on a user display interface.

9. The method of claim 1, wherein the query specific DIN includes two or more entities associated with interactions involving the query over a defined time window.

10. The method of claim 9, wherein the two or more entities are schematically represented in the query specific DIN as nodes and wherein the nodes are interconnected based on whether associated entities have an interaction in the social network within the time window.

11. The method of claim 1, further comprising:
in response to receiving the user-provided query and an associated time window, calculating one or more of the dynamic influence scores based on one or more of the query specific DINs; and
returning all content in the social network that matches the query,
wherein the matching content is shown in a display interface, ranked according to the dynamic influence scores of each respective one of the entities that created the returned content.

12. The method of claim 11, wherein each of the dynamic influence scores is based upon rumor centrality with normalization.

13. A method for tracking the dynamic influence of an entity operating within a social network with a processor, comprising the steps of:
receiving a query comprising user-generated social network content;
searching a database for entries referencing the social network content;
identifying an interaction between an entity participating within the social network and the social network user-generated content, wherein the interaction comprises proliferating the social network media content to other entities and occurs within a specified time window;
identifying a query specific dynamic interaction network (DIN) comprising a plurality of said entities;
calculating a dynamic influence score for an entity in the query specific DIN; and
displaying the calculated dynamic influence score with a display interface,
wherein the query specific DIN is constructed using only interactions involving the query, and the dynamic influence score comprises a measure of the reach of an entity with the DIN to proliferate social network media content to other entities,
wherein calculating a dynamic influence score for the entity further comprises;
calculating a first dynamic influence score for the entity within the query specific DIN;
calculating a second dynamic influence score for the entity within a global DIN; and
combining the first dynamic influence score and the second dynamic influence score.

14. Non-transient computer readable media comprising executable instructions for tracking the dynamic influence of an entity operating within a social network with a processor, comprising the steps of:
receiving a query comprising user-generated social network content;
searching a database for entries referencing the social network content;
identifying an interaction between an entity participating within the social network and the social network content, wherein the interaction comprises proliferating the social network media content to other entities and occurs within a specified time window;
identifying a query specific dynamic interaction network (DIN) comprising a plurality of said entities;
calculating a dynamic influence score for an entity in the query specific DIN;
constructing the query specific DIN using data from the social network that falls within the specified time window and calculating a query specific dynamic influence score for each entity in the query specific DIN, and constructing a global DIN using data from the social network that falls within the specified time window and calculating a global dynamic influence score from the global DIN; and calculating a global dynamic influence score from the global DIN and combining at least one of the query specific dynamic influence scores and the global dynamic influence score to produce an overall dynamic influence score for each entities in the query specific DIN, wherein the query specific DIN is constructed using only interactions involving the query, and the dynamic influence score comprises a measure of the reach of an entity with the DIN to proliferate social network media content to other entities, and wherein the overall dynamic influence scores enable the user to see how influential different entities are on different queries or topics within specific time windows.

15. The non-transient media of claim 14, wherein the dynamic influence score further comprises:
   a degree component; and
   a reach component.

16. The non-transient media of claim 14, further comprising the step of assigning a rank to the entity based in part on the dynamic influence score.

17. Non-transient computer readable media comprising executable instructions for tracking the dynamic influence of an entity operating within a social network with a processor, comprising the steps of:

receiving a query comprising user-generated social network content;

searching a database for entries referencing the social network content;

identifying an interaction between an entity participating within the social network and the social network content, wherein the interaction comprises proliferating the social network media content to other entities and occurs within a specified time window;

identifying a query specific dynamic interaction network (DIN) comprising a plurality of said entities;

calculating a dynamic influence score for an entity in the query specific DIN;

displaying the calculated dynamic influence score with a display interface;

calculating a first dynamic influence score for the entity within the query specific DIN;

calculating a second dynamic influence score for the entity within a global DIN; and combining the first dynamic influence score and the second dynamic influence score, wherein the query specific DIN is constructed using only interactions involving the query, and the dynamic influence score comprises a measure of the reach of an entity with the DIN to proliferate social network media content to other entities.

* * * * *